US005803942A

United States Patent [19]

Scott

[11] Patent Number: 5,803,942

[45] Date of Patent: Sep. 8, 1998

[54] METHOD AND APPARATUS FOR DELIVERING A CASED GLASS STREAM

[75] Inventor: Garrett L. Scott, Toledo, Ohio

[73] Assignee: Owens-Brockway Glass Container Inc., Toledo, Ohio

[21] Appl. No.: 840,164

[22] Filed: Apr. 14, 1997

[51] Int. Cl.[6] .............................. C03B 7/00; C03B 7/094

[52] U.S. Cl. .............................. 65/121; 65/128; 65/145; 65/325; 65/355

[58] Field of Search .............................. 65/145, 146, 121, 65/122, 123, 126, 127, 129, 128, 324, 325, 328, 330, 331, 355, 346, 347, 135.1, 179, 180

[56] References Cited

U.S. PATENT DOCUMENTS

| | | | |
|---|---|---|---|
| 1,692,589 | 11/1928 | Soubier . | |
| 1,805,987 | 5/1931 | Keller | 65/355 |
| 1,828,217 | 10/1931 | Barker, Jr. . | |
| 3,160,492 | 12/1964 | Chapman et al. | 65/355 |
| 3,508,904 | 4/1970 | Keefer . | |
| 3,516,812 | 6/1970 | Donnelly et al. . | |
| 3,554,726 | 1/1971 | Daly . | |
| 3,560,188 | 2/1971 | Winzer . | |
| 3,580,713 | 5/1971 | Schirm et al. . | |
| 3,625,671 | 12/1971 | Schirm et al. . | |
| 3,905,790 | 9/1975 | Strickland . | |
| 4,162,907 | 7/1979 | Anderson . | |
| 4,713,106 | 12/1987 | McCague . | |
| 4,740,401 | 4/1988 | Barkhau et al. . | |

FOREIGN PATENT DOCUMENTS

| | | |
|---|---|---|
| 756998 | 3/1971 | Belgium . |
| 0722907 | 7/1996 | European Pat. Off. . |
| 0722908 | 7/1996 | European Pat. Off. . |

*Primary Examiner*—Steven P. Griffin

[57] ABSTRACT

Apparatus for forming a cased glass stream that includes at least one pair of aligned orifices coupled to sources of core and casing glass such that glass flows by gravity from the glass sources through the aligned orifices to form a cased glass stream. The orifices are carried by an orifice housing mounted on a frame for movement into seating engagement of the orifice housing against the core and casing glass delivery mechanisms. A fluid manifold is mounted on the orifice housing, with an inlet for connection to a source of cooling fluid such as air. A plurality of outlets on the manifold are directed toward the area of seating engagement between the orifice ring housing and the core and casing glass delivery mechanisms for cooling the seating area and thereby reducing leakage of glass between the housing and the glass delivery mechanisms. Inasmuch as the cooling air manifold is mounted on and carried by the orifice housing, the manifold outlets are automatically directed toward the seating area upon seating of the orifice housing against the glass delivery mechanisms, and do not require separate replacement or adjustment.

12 Claims, 3 Drawing Sheets

METHOD AND APPARATUS FOR DELIVERING A CASED GLASS STREAM

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. No. 08/374,371 filed Jan. 18, 1995, now abandonded, and Ser. No. 08/374,372 filed Jan. 18, 1995, now abandoned, disclose techniques for delivering such a cased glass stream in which core glass from a first source is delivered through a first orifice. A second orifice is vertically spaced beneath and aligned with the first orifice, and is surrounded by a chamber that communicates with the second orifice through the gap between the first and second orifices. A heated tube delivers casing glass from a second glass source to the chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines. U.S. application Ser. No. 08/671,894 filed Jun. 28, 1996 discloses an improved apparatus and method in which the orifices are disposed within an orifice ring housing that is carried by a frame for bringing the orifice ring housing into seating engagement against the core and casing glass delivery mechanisms. The frame is mounted on springs that compress as the orifice ring housing seats against the core and casing glass delivery mechanisms, and has jack screws for firmly locking the frame and orifice ring housing in position against the glass delivery means.

Although the techniques disclosed in the noted patent applications address and overcome problems theretofore extant in the art, further improvements remain desirable. For example, it is difficult to align the orifice ring housing inlet openings to the core and casing glass delivery mechanisms so that the mating surfaces close completely to prevent glass leakage. It has been proposed to place soft refractory clay and water mud mixtures on the sealing face of the orifice ring housing prior to engagement of the orifice ring housing against the glass delivery mechanisms. However, high-temperature preheating of the orifice ring housing prior to installation can cause the mud mixture to harden prematurely. It has also been proposed to direct cooling air around the area or joint of seating engagement between the orifice ring housing and the glass delivery mechanisms for cooling this area, causing devitrification and solidification of any glass that leaks through the seating joint, and thereby reducing or eliminating further glass leakage. These air tubes are manually positioned, and must be removed and replaced whenever the orifice ring housing is replaced. The cooling air tubes can readily become misaligned by being bumped out of position, require daily monitoring, are expensive to assemble, and time-consuming to position and adjust.

It is therefore a general object of the present invention to provide a method and apparatus for reducing or preventing leakage between the orifice ring housing and the glass delivery mechanisms in a cased glass delivery system of the described character by cooling the outside of the joint between the orifice ring housing and the glass delivery mechanisms, in which the cooling means is inexpensive to manufacture and position, which does not require extensive monitoring and adjustment, and which is automatically positioned upon replacement of an orifice ring housing.

Apparatus for forming a cased glass stream in accordance with one aspect of the present invention includes at least one pair of aligned orifices coupled to sources of core and casing glass such that glass flows by gravity from the glass sources through the aligned orifices to form a cased glass stream. The orifices are carried by an orifice housing mounted on a frame for movement into seating engagement of the orifice housing against the core and casing glass delivery mechanisms. A fluid manifold is mounted on the orifice housing, with an inlet for connection to a source of cooling fluid such as air. An outlet on the manifold, preferably in the form of a plurality of outlets, is directed toward the area of seating engagement between the orifice ring housing and the core and casing glass delivery mechanisms for cooling the seating area and thereby reducing leakage of glass between the housing and the glass delivery mechanisms. Inasmuch as the cooling air manifold is mounted on and carried by the orifice housing, the manifold outlets are automatically directed toward the seating area upon seating of the orifice housing against the glass delivery mechanisms, and do not require separate replacement or adjustment.

An orifice ring housing assembly in accordance with a second aspect of the present invention thus includes first and second spaced orifice rings having aligned first and second orifices for receiving the core glass stream, and a chamber surrounding the second orifice for receiving the casing glass stream. The orifice ring housing assembly includes an area for abutment seating engagement with the core and casing glass delivery mechanisms such that the core glass is delivered to the orifices in sequence and the casing glass is delivered to the chamber that surrounds the second orifice. A cooling fluid manifold is mounted on the orifice ring housing assembly. The cooling air manifold has an inlet for receiving cooling air, and an outlet oriented in such a way as to be automatically directed to the area of seating engagement between the orifice ring housing assembly and the core and casing glass delivery mechanisms when the housing assembly is brought into seating abutment with the core and casing glass delivery mechanisms. The manifold cooling air outlet preferably comprises a plurality of outlets disposed in a circumferential array around the area of seating engagement for uniformly cooling the exterior of the seating joint between the orifice ring housing assembly and the core and casing glass delivery mechanisms.

A method of cooling the area of seating engagement between the orifice ring housing and the core and casing glass delivery mechanisms in accordance with a third aspect of the present invention thus comprises the step of providing a fluid manifold having an inlet for receiving cooling fluid and an outlet for delivering cooling fluid, and mounting the manifold on the orifice ring housing in such a way that the fluid outlet is directed to the area of the housing for seating engagement with the core and casing glass delivery mechanisms. The orifice ring housing is then brought into abutment seating engagement with the core and casing glass delivery mechanisms so that the outlet on the cooling fluid manifold is automatically directed to the area of seating engagement. Cooling fluid, preferably air, is then delivered to the manifold inlet, and directed by the manifold outlet to the seating joint so as to cool the outer area of the joint and thereby reduce glass leakage through the abutment joint. The manifold outlet preferably is provided in the form of a plurality of outlets on the manifold so as to extend entirely around the area of seating engagement between the orifice ring housing and the core and casing glass delivery mechanisms.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
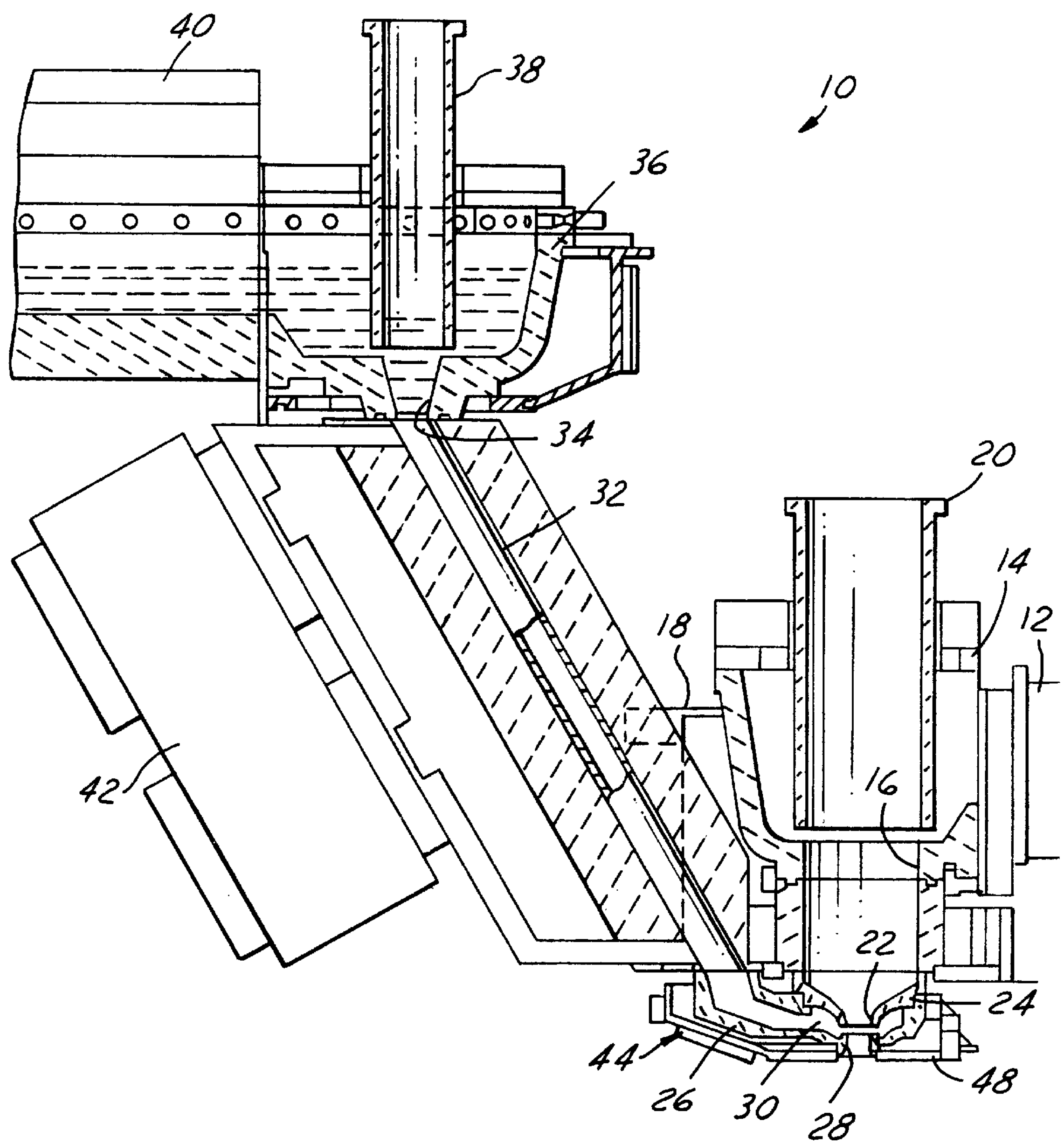
FIG. 1 is a fragmentary elevational schematic diagram of a glass delivery system in accordance with a presently preferred embodiment of the invention.
Figure 2:
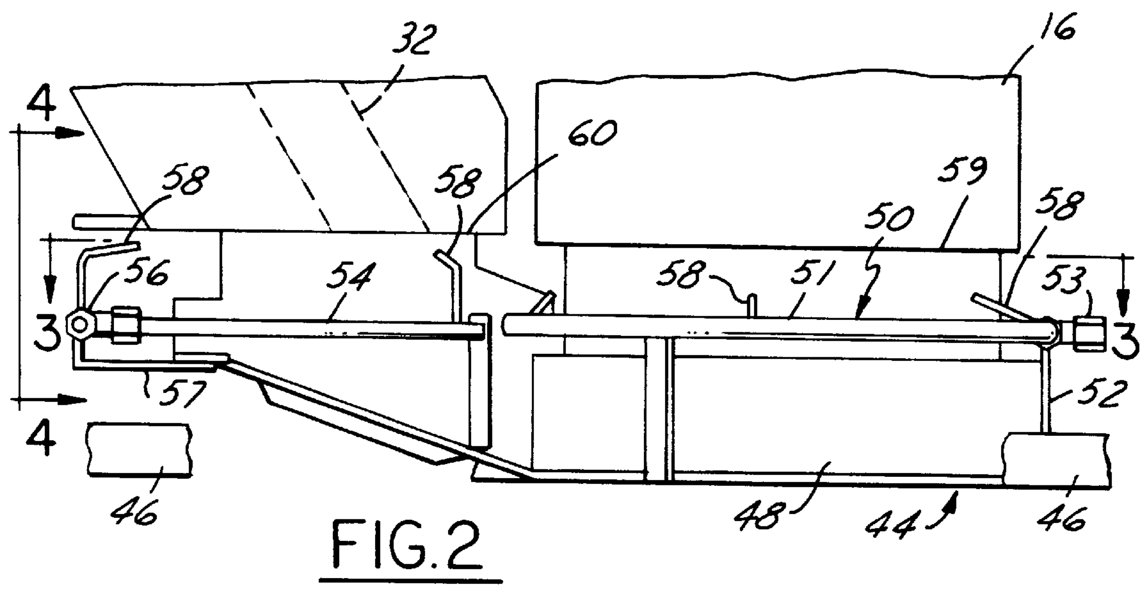
FIG. 2 is a fragmentary elevational view on an enlarged scale of a portion of the glass delivery system illustrated in FIG. 1.
Figure 3:
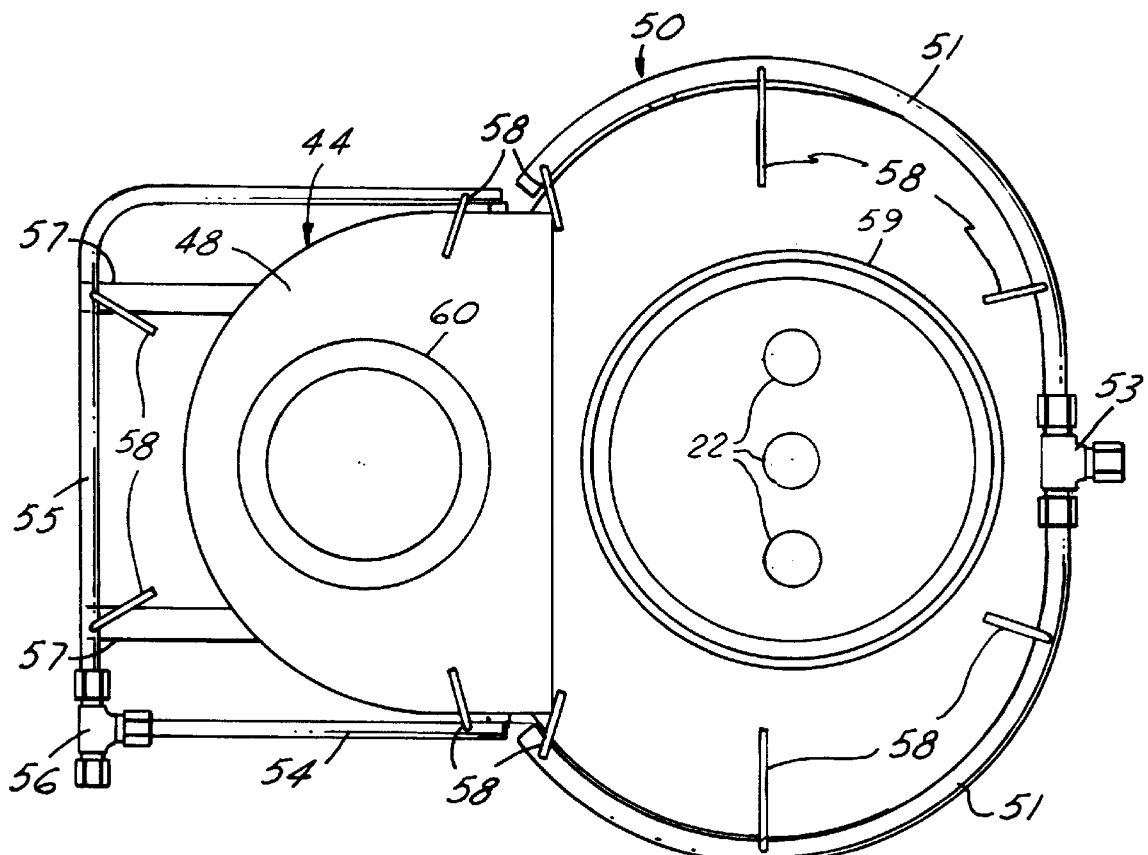
FIG. 3 is a sectional view taken substantially along the line 3—3 in FIG. 2, and providing a plan view of the orifice ring housing with integral cooling air manifold in accordance with the presently preferred embodiment of the invention and, FIG. 4 is an end elevational veiw of the orifice ring housing assembly with integral cooling air manifold.

FIG. 1 illustrates a system 10 for delivering a stream of cased glass. A first forehearth 12 delivers core glass to a spout 14 that has at least one opening 16 at the lower end thereof. Spout 14 is surrounded by a protective case 18, preferably constructed of nonmagnetic metal such as stainless steel. A tube 20 controls delivery of core glass from spout 14 through opening 16 to and through at least one first orifice 22 carried by an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 24, 26. Chamber 30 communicates with orifice 28 by means of a lateral space or gap between orifices 22, 28. Annular chamber 30 is coupled by a delivery tube 32 to the opening 34 at the lower end of a casing glass spout 36. Spout 36 includes a delivery control tube 38, and is coupled to a casing glass forehearth 40. Delivery tube 32 is resistance-heated by control electronics 42 for maintaining flow of casing glass to chamber 30. To the extent thus far described, system 10 in FIG. 1 is essentially the same as disclosed in above-noted U.S. application Ser. Nos. 08/374,371 and 08/374,372, both now abandonded. As disclosed in above-noted U.S. application Ser. No. 08/671,894 filed Jun. 28, 1996, and referring to FIG. 2, orifice rings 24, 26 are mounted within an orifice ring housing 44, so that both orifice rings are moveable as a unit into and out of engagement with the sources of core and casing glass. Orifice ring housing 44 is carried by a rectangular frame 46 for bringing orifice ring housing 44 into abutment seating engagement with the lower ends of the core and casing glass delivery tubes. The disclosures of above-noted U.S. application Ser. Nos. 08/374,371, 08/374,372 and 08/671,894 are incorporated herein by reference by purposes of background.

Figure 4:
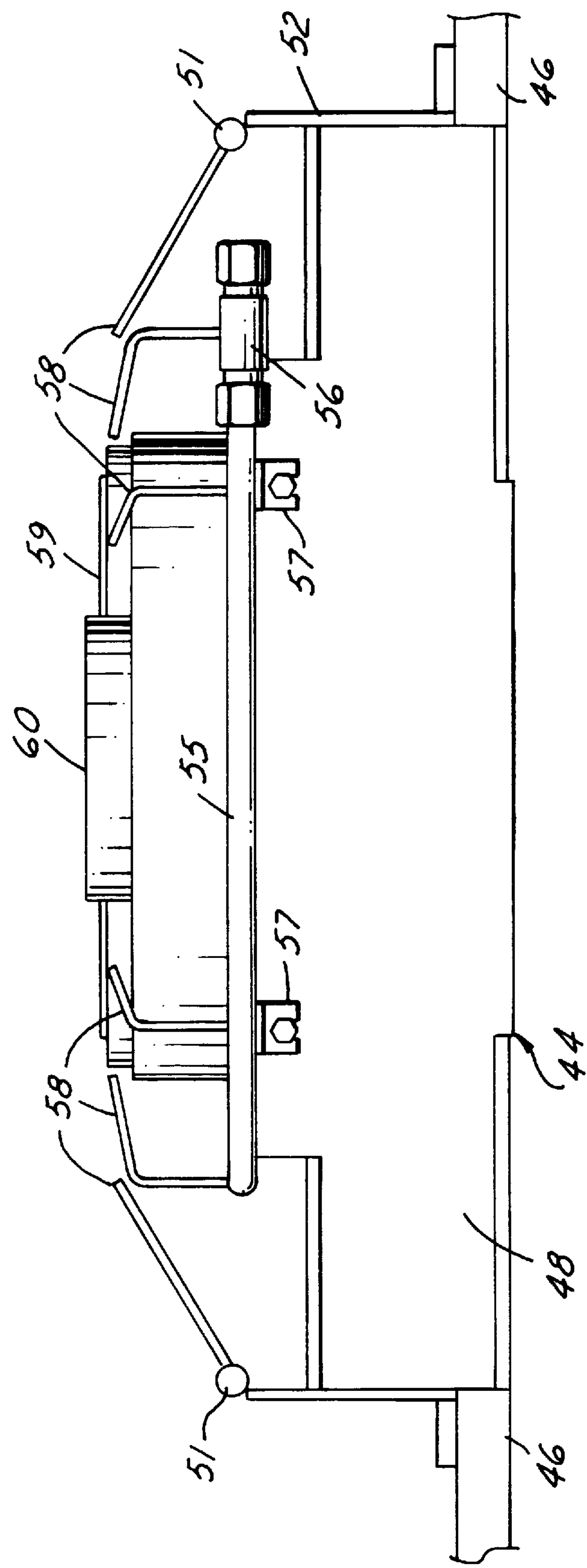

In accordance with the present invention, orifice ring housing 44 is provided in the form of an assembly that includes orifice rings 24, 26 (FIG. 1), a surrounding enclosure 48, and a cooling air manifold 50 mounted on enclosure 48. Manifold 50 is segmented, having a pair of arcuate tubes 51 with depending legs 52 affixed to housing 44 and an inlet fitting 53 that joins tubes 51 end-to-end to form a C-shaped manifold segment. A straight tube section 54 and an L-shaped tube section 55 are joined by a second inlet fitting 56 to form a second C-shaped manifold segment. Mounting brackets 57 (FIG. 4) depend from tube section 55 for affixation to housing 44. Each tube section 51, 54, 55 has one or more outlet nozzles or jets 58, so that the multiple jets 58 are effectively disposed in a circumferential array entirely around manifold 50, and extend radially inwardly and axially upwardly therefrom. Specifically, jets 58 are oriented so as to be directed in assembly with enclosure 44 toward the areas 59, 60 of orifice ring housing 44 for abutment seating engagement with core and casing glass delivery tubes 16, 32 respectively. That is, manifold 50 is mounted on orifice ring housing 44 in such a way that jets 58 are directed toward seating areas 59, 60 of the orifice ring housing. In this way, when orifice ring housing 44 is brought into abutment seating engagement with core and casing glass delivery tubes 16, 32 by operation of frame 46 (as disclosed in above-referenced application Ser. No. 08/671,894), jets 58 are automatically directed toward the seating joint. In this way, with inlet fittings 53, 56 connected to sources of compressed air (which may be separately controlled), cooling air is automatically directed around the outer edge of the seating joint so as to cool the joint and thereby help reduce or eliminate leakage of glass through the abutment seating joint. Since the cooling air manifold is provided as part of the orifice ring housing assembly, it is automatically positioned for operation when the orifice ring housing assembly is brought into seating abutment with the core and casing glass delivery tubes. No additional adjustment or set-up is required. Furthermore, the manifold is firmly mounted in assembly and closely contoured to the periphery of the orifice ring housing so as to reduce the likelihood of misalignment by being bumped by an operator or an operating mechanism.

I claim:

1. Apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a gap between said first and second orifices, and means for delivering casing glass from a second source to said chamber such that glass flows by gravity through said orifices from said first and second sources to form said cased glass stream, said first and second orifices being carried by an orifice housing assembly with means for moving said assembly into seating engagement against said means for delivering core and casing glass so as to form an area of seating engagement, wherein said orifice housing assembly further includes a fluid manifold mounted on said housing assembly, and having inlet means for connection to a source of cooling fluid and outlet means directed toward the area of seating engagement between said assembly and said means for delivering core and casing glass for cooling said area and thereby reducing leakage of glass between said housing assembly and said means for delivering core and casing glass.

2. The apparatus set forth in claim 1 wherein said outlet means comprises an array of fluid outlet openings extending around said area of seating engagement between said orifice housing assembly and said means for delivering core and casing glass.

3. The apparatus set forth in claim 2 wherein said manifold comprises fluid tube means extending around said area of seating engagement between said orifice housing assembly and said means for delivering core and casing glass.

4. The apparatus set forth in claim 3 wherein said manifold is external to said housing assembly.

5. The apparatus set forth in claim 4 wherein said fluid tube means comprises separate tube segments externally surrounding said means for delivering core glass and said means for delivering casing glass, each of said tube segments having an inlet opening and an array of outlet openings.

6. An orifice housing assembly for an apparatus for forming a cased glass stream having means for delivering core and casing glass in laterally spaced streams, said orifice housing assembly comprising:

first and second spaced orifice rings having aligned first and second orifices for receiving said core glass stream, and a chamber surrounding said second orifice for receiving said casing glass stream, means for abutment with said means for delivering core and casing glass around an area of seating engagement between said assembly and said means for delivering core and casing glass such that said core glass stream communicates with said orifices in succession and said casing glass stream is fed to said chamber, and a cooling fluid manifold having inlet means for receiving cooling fluid and outlet means, said manifold being such that said outlet means is directed toward said area of seating engagement when said assembly is brought into abutment with said means for delivering core and casing glass.

7. The assembly set forth in claim 6 wherein said outlet means comprises an array of fluid outlet openings extending around said area of seating engagement.

8. The assembly set forth in claim 7 wherein said manifold comprises fluid tube means extending around said area of seating engagement.

9. The apparatus set forth in claim 8 wherein said tube means and said outlet openings are mounted externally of said rings.

10. In an apparatus for forming a cased glass stream in which an orifice housing is in abutting engagement with means for delivering streams of core and casing glass, said abutting engagement forming an area of seating engagement between said orifice housing and said means for delivering streams of core and casing glass, a method of cooling the area of seating engagement between said orifice housing and said means for delivering streams of core and casing glass, and thereby reducing glass leakage through said area, said method comprising the steps of:

(a) providing a fluid manifold having inlet means for receiving cooling fluid and outlet means for delivering cooling fluid, (b) mounting said manifold on said orifice housing in such a way that said outlet means are directed to the area of seating engagement when said orifice housing is in abutting engagement with said means for delivering streams of core and casing glass, (c) bringing said orifice housing into said abutting engagement with said means for delivering streams of core and casing glass so that said outlet means on said manifold is directed toward the area of seating engagement between said orifice housing and said means for delivering streams of core and casing glass, and (d) delivering cooling fluid to said inlet means of said manifold and discharging said cooling fluid through said outlet means to cool said area of seating engagement between said housing and said means for delivering core and casing glass.

11. The method set forth in claim 10 wherein said step (a) comprises the step of providing a plurality of said outlet means on said manifold so as to extend entirely around said area of seating engagement between said housing and said means for delivering core and casing glass when said orifice housing is in said abutment seating engagement with said means for delivering streams of core and casing glass.

12. The method set forth in claim 11 wherein said step (b) comprises the step of externally mounting said manifold on said housing.

* * * * *